United States Patent [19]

Harshbarger, III et al.

[11] Patent Number: 4,627,483
[45] Date of Patent: Dec. 9, 1986

[54] HEAT PUMP CONTROL SYSTEM

[75] Inventors: John H. Harshbarger, III; John H. Harshbarger, Jr., both of Xenia, Ohio

[73] Assignee: Visual Information Institute, Inc., Xenia, Ohio

[21] Appl. No.: 569,218

[22] Filed: Jan. 9, 1984

[51] Int. Cl.$^4$ .............. F25B 13/00; F25B 29/00
[52] U.S. Cl. ............................ 165/2; 165/12; 165/29
[58] Field of Search ............... 165/29, 12, 2; 62/234, 62/155, 156, 160

[56] References Cited

U.S. PATENT DOCUMENTS

| 3,273,635 | 9/1966 | Jobes | 165/29 |
|---|---|---|---|
| 4,102,389 | 7/1978 | Wills | 165/29 |
| 4,209,994 | 7/1980 | Mueller et al. | 62/155 |
| 4,211,089 | 7/1980 | Mueller et al. | 62/209 |
| 4,211,207 | 7/1980 | Molivadas | 126/433 |
| 4,253,130 | 2/1981 | Newell | 361/22 |
| 4,262,530 | 4/1981 | Gerquest | 73/861.8 |
| 4,265,298 | 5/1981 | Sumner, Jr. et al. | 165/2 |
| 4,265,299 | 5/1981 | Harnish | 165/12 |
| 4,269,261 | 5/1981 | Kountz et al. | 165/2 |
| 4,289,272 | 9/1981 | Murase et al. | 236/91 D |
| 4,301,660 | 11/1981 | Mueller et al. | 62/126 |
| 4,311,497 | 1/1982 | Newell | 62/158 |
| 4,328,680 | 5/1982 | Stamp, Jr. et al. | 62/234 |
| 4,333,316 | 6/1982 | Stamp, Jr. et al. | 62/126 |
| 4,338,791 | 7/1982 | Stamp, Jr. et al. | 165/29 |
| 4,346,755 | 8/1982 | Alley et al. | 165/29 |
| 4,373,350 | 2/1983 | Noland | 165/29 |

FOREIGN PATENT DOCUMENTS

0061530  5/1981  Japan .................. 62/234

Primary Examiner—William R. Cline
Assistant Examiner—John K. Ford
Attorney, Agent, or Firm—Jeffers, Irish & Hoffman

[57] ABSTRACT

A control system for controlling a heating system having a heat pump and a source of supplemental heat. Simultaneous operation of the heat pump and supplemental heat source is monitored, and when such simultaneous operation occurs for a given portion of a heating cycle, the heat pump will shutdown until the temperature has risen by a predetermined amount or a given interval of time has elapsed. The heat pump is also shutdown if the outside ambient temperature falls below a certain level and is automatically reenabled if the outside ambient exceeds a second level.

39 Claims, 6 Drawing Figures

HEAT PUMP CONTROL SYSTEM

BACKGROUND OF THE INVENTION

The present invention relates to a heating system employing both a heat pump and a source of supplemental heat, such as a resistance heat furnace, and in particular to a control system whereby most efficient utilization of the two heat sources is realized.

A heat pump utilizes a compressor and a refrigerant recirculation system including a condenser and evaporator to provide both cooling in the warmer seasons of the year and heating in the winter. The dual function of the heat pump is accomplished by locating the low temperature evaporator in the interior space during the summer, and the high temperature condenser is located in the interior space during the winter months.

Since heat pumps utilize ambient air as the heat source when operating with the condenser in the space to be heated during the winter months, they operate efficiently only when the outside air temperature is above a certain level, such as 40°. In regions of colder average winter temperatures, supplemental heat, such as is supplied by fossil fuel furnaces or resistive heat, is necessary in order to maintain the temperature within the building at the desired level. Furthermore, as the outside ambient temperature drops below 40°, the efficiency of the heat pump suffers because of frost buildup on the evaporator coils In the defrost cycle, the heat pump is run in the reverse direction to supply heat to the outside evaporator coils thereby melting the frost, following which normal operation be resumed. Of course, during the defrost cycle of the heat pump, heat is not being supplied to the building, and supplemental heat must be relied on to maintain the desired ambient temperature. Accordingly, supplemental heat is required when the heat pump is in the defrost cycle and when the outdoor temperature is below that which permits adequate transfer of heat from the outdoor ambient air to the interior of the building.

Whenever the outside ambient temperature is below that which permits adequate transfer of heat, both the heat pump and the supplemental heat source are operating simultaneously, with greater energy demand than with the heat pump operating alone or with the supplemental heat operating alone. When the heat pump and supplemental heat source are operating together beyond a certain portion of a heat cycle, there is greater energy consumption than if only the supplemental heat source alone is used for a given quantity of heat delivered. During the defrost cycle of the heat pump, energy is required to heat the outside evaporator coils, and supplemental heat may be necessary to maintain the desired inside temperature level. Accordingly, if frequent and lengthy defrost cycles are necessary to maintain the evaporator coils free of frost, less energy will be consumed by operating the supplemental heating alone and shutting down the heat pump entirely. This is true even though heat pump operation is generally more efficient than supplemental heating, for example resistance or fossil fuel burning, depending on the outside temperature and humidity conditions.

For example, consider a heating system using a 15 kilowatt heat pump and a 30 kilowatt resistive heater. The heat cycle is one hour, that is, for any given period of one hour, the interior zone to be heated will demand heat input. The most efficient case exists when heat is required solely from the heat pump, because maximum energy consumed is 15 kilowatt-hours. However, should conditions require that the heat pump and resistive heater be run in tandem, the maximum energy consumption is 45 kilowatt-hours, which is substantially less efficient than if only the resistive heater ran for the cycle consuming 30 kilowatt-hours. Weather conditions can permit either the heat pump operating alone or operating in tandem with the resistive heater during the heat cycle.

Prior art control of heat pump operation is generally accomplished by means of an electromechanical thermostat mechanism, with separate temperature sensors for each state of heat pump system operation. Furthermore, there are defrost timers, relays, and pressure and temperature sensors utilized to control system defrost cycling, but since they are internal to the heat pump system, they are not readily available for immediate user control. Furthermore, the weather and condition of the heat pump system form a complex set of factors that are constantly changing, thereby making it very complex to determine the combination of heat pump and resistive heating which renders maximum efficiency. To maintain the heat pump system in the most efficient state, would require the user to continually measure all of these factors and perform complex computations. Accordingly, prior art heat pump installations do not have the means available to the user to effectively operate the heat pump systems in the lowest energy demand state while maintaining the temperature of the building at the desired level.

To summarize, the current problem with heat pump installations is that their advantage over other methods of heating exists only when the heat pump operates without supplemental heat. The more frequently that the heat pump operates with supplemental heat, either during its heating cycle or defrost cycle, the less advantage there is in terms of energy efficiency over other heating plants, such as resistance or fossil fuel furnaces. This has resulted in heat pumps being used more often in regions where the outdoor temperatures are sufficiently high during the winter months that the need for supplemental heat is infrequent, such as in the southern and southwestern regions of North America. The use of heat pumps in cooler northern climates, particularly those climates where the air humidity is high during the winter months, requires very complex controls which, although they can perhaps be justified for large buildings, are not feasible for domestic and smaller commercial and industrial installations.

SUMMARY OF THE INVENTION

The present invention, in one form thereof, overcomes the disadvantages and problems associated with prior art heat pump systems by monitoring the amount of time that supplemental heating is required during a heat cycle, and maximizing the efficiency of the total heating plant by shutting down the heat pump and operating solely on supplemental heat if supplemental heat is required during too large a portion of the heating cycle. As an example, if, during a heating cycle of one hour, the supplemental heating plant is operating for more than 50% of the time, the heat pump will be shutdown and only supplemental heat will be used to heat the building. Since the heat pump thermostat will be calling for heat at all times that the supplemental heat source is operating, the heat pump will also be operating either in its normal heating mode or in its defrost cycle. This situation would result in a less efficient operation than if the supplemental heat source were operating alone, and will trigger a shutdown of the heat pump.

The control system can either monitor the portion of the heating cycle during which the supplemental heat is operating, or detect simultaneous operation of both the supplemental heat source and the heat pump, both in the normal heating and defrost modes. In a preferred form of the invention, the heat pump remains disabled until one of a number of different conditions occurs justifying reenablement of the heat pump. If the outdoor operating temperature is below 15° F., the heat pump will always be disabled because of the inability of the heat pump to transfer a sufficient amount of heat to the interior space to be heated. If the outside ambient temperature is above 40° F., then the heat pump will again be reenabled so that when its thermostat calls for heat, it will operate in its normal mode. Of course the 15° F. shutdown temperature and the 40° F. restore temperature may vary depending on the type of heat pump, weather conditions, and the like.

Once the heat pump has been disabled, and if the outdoor temperature is below 40° F. but above 15° F., the heat pump will again be enabled when the outdoor temperature sensed by an external temperature probe is a predetermined amount higher than the outside ambient at heat pump shutdown, for example, 5° higher. Also, if 12 hours have elapsed since the last shutdown of the heat pump, and the outside ambient temperature is higher than 15° F., the heat pump will again be enabled to run through a single heating cycle. If during the heating cycle the supplemental heat is still operating for more than a predetermined portion of the time, then the heat pump will again be disabled.

In a preferred embodiment of the invention, a microcomputer is utilized to perform the calculations and store the appropriate data to cause the control system to operate. The microcomputer interrogates the supplemental heating system, either directly or via the thermostat control line, on a regular periodic basis, and increments or decrements a counter in the microcomputer depending on whether the supplemental heating system is operating or not operating, respectively. Once the counter reaches a critical count indicating that on more than half of the interrogations the supplemental heating system was operating, then the heat pump will be shutdown. If the heat pump is in a defrost cycle, however, shutdown will be delayed until the defrost cycle has completed.

In the disclosed embodiment of the invention, the control line from the heat pump thermostat is connected to the heat pump control through the monitor/override module. If the microcomputer calls for heat pump enablement, the control line is passed through directly to the heat pump input, but if the microcomputer calls for disablement of the heat pump, then this control line is interrupted. Accordingly, heat pump disablement is accomplished by simply interrupting the thermostat control, thereby minimizing the extent to which internal connections must be made within the heat pump. The only other connection that is necessary is a control line from the defrost cycle circuitry back to the monitor/override module to delay disablement of the heat pump until the defrost cycle has been completed.

The invention, in one form thereof, relates to a heating system having a supplemental heating source for supplying heat to an interior space, a heat pump for supplying heat to the interior space, and a control mechanism including at least one thermostat having a sensor in the interior space for activating one or both of the supplemental heating source and heat pump into operation. A heat pump control override mechanism detects the simultaneous operation of the heat pump and supplemental heating source and disables the heat pump from operating when the heat pump and supplemental heating source are detected as simultaneously operating for a predetermined portion of a given cyclically recurring time interval. This may be accomplished by periodically interrogating the heat pump and auxiliary heat source to detect simultaneous operation and then incrementing a counter if simultaneous operation occurs and decrementing the counter if no simultaneous operation is occurring, or vice versa. The heat pump would be disabled when the predetermined count is reached.

In accordance with another form of the invention, there is provided a heating system having a supplemental heating source for supplying heat to an interior space, a heat pump for supplying heat to the interior space, and a control mechanism connected to the heat pump including means for detecting the ambient temperature in the interior space and selectively activating or deactivating the heat pump and supplemental heating source in response to the ambient temperature. A heat pump control override mechanism detects deactivation of the supplemental heating source and disables the heat pump if the supplemental heating source is detected as being activated for a predetermined portion of a given time interval.

In accordance with yet another form of the invention, there is provided a control system for controlling a heating system having a supplemental heat source for supplying heat to a building, a heat pump for supplying heat to the building and a thermostat apparatus for activating and deactivating the supplemental heat source and heat pump in response to ambient temperatures sensed by the thermostat. The control system comprises a monitor adapted to be connected to either the supplemental heat source or the thermostat for detecting deactivation of the supplemental heat source for a predetermined portion of a given cyclically recurring time interval. An override means connected to the heat pump and to the monitor disables the heat pump in response to the monitor detecting deactivation of the supplemental heat source for said predetermined portion of the time interval.

The invention also relates, in one form thereof, to a heating system having a supplemental heating source for supplying heat to an interior space wherein the supplemental heating source includes a supplemental heat thermostat for sensing the ambient temperature in the interior space and activating into operation the supplemental heating source in response to the sensed temperature falling below a first predetermined limit. The heating system also includes a heat pump for supplying heat to the interior space and including a thermostat for sensing the ambient temperature and being connected to a control mechanism on the heat pump, wherein the control mechanism activates the heat pump into operation in response to the ambient temperature falling below a second predetermined limit, which limit is higher than the first limit. A heat pump control monitor and override mechanism detects the operation of the supplemental heating source and disables the heat pump when the supplemental source is detected as being activated for a predetermined portion of a heating cycle.

The invention also relates, in one form thereof, to a method of controlling a heating system having a supplemental heat source and heat pump for supplying heat to an interior space wherein the heating system includes a thermostat that activates the heat pump and/or supplemental heat source in response to ambient temperatures sensed by the thermostat. The method comprises sensing when the supplemental heat source is operating during a cyclically recurring time interval and disabling the heat pump when the supplemental heat source is operating for a predetermined portion of the cyclically recurring time interval. In another form thereof, the method comprises sensing when the heat pump and supplemental heat source are simultaneously operating for a predetermined portion of the recurring time interval, and disabling the heat pump when this condition occurs.

It is an object of the present invention to provide a heating system employing both a heat pump and a source of supplemental heat wherein inefficient simultaneous operation of the heat pump and supplemental heat source is avoided when such simultaneous operation exceeds a predetermined portion of a heating cycle.

It is a further object of the present invention to provide a control system for a heating system wherein the heat pump is shutdown and only supplemental heating is utilized to heat the enclosure when conditions prevent efficient operation of the heat pump. Heat pump operation is resumed when outside ambient temperature rises sufficiently above that at shutdown, is above a predetermined level or when a predetermined amount of time as elapsed since heat pump shutdown.

A still further object of the present invention is to provide a heat pump control system wherein no substantial modification of either the heat pump or supplemental heating source is required, and wherein the inherent functioning of the heat pump is unaltered.

BRIEF DESCRIPTION OF THE DRAWING

These and other objects and advantages of the present invention will be apparent from the detailed description of a preferred embodiment which follows, taken together with the accompanying drawings wherein.

DETAILED DESCRIPTION

Figure 1:
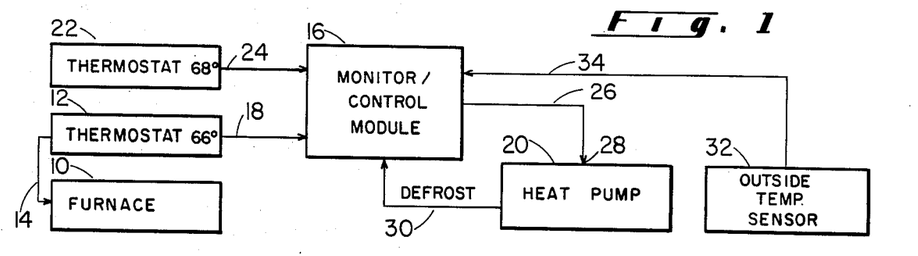
FIG. 1 is a block diagram of a heating system incorporating the present invention.

With reference now to the drawings, and in particular to FIG. 1, the heating system comprises a conventional furnace 10, which may be of the gas, oil or electric resistance type, or may comprise electric resistance heaters distributed throughout the building to be heated. A thermostat 12 is connected to furnace 10 by thermostat control lines 14 and is set to activate furnace 10 when the ambient temperature within the building or interior space to be heated falls below a predetermined level, for example, 66° F. Thermostat 12 is also connected to the control module 16 forming a part of the present invention by lines 18. Furnace 10 and its associated thermostat 12 together comprise a supplemental heat source which will be activated when the heat pump 20 is unable to satisfy the heating requirements, such as when the outside ambient temperature is too low or the heat pump 20 is in its defrost cycle.

Heat pump 20 may be any one of a number of commercially available types and generally comprises a condenser located within the building and connected to the various rooms to be heated by forced air ducting, an evaporator located in thermal contact with the outside ambient, and a compressor for pumping the refrigerant in a recirculating fashion through the condenser and evaporator coils. Since heat pumps are well known, no further details of them will be discussed.

Thermostat 22, which is typically set slightly higher than the supplemental heat thermostat 12, is connected to heat pump 20 through control module 16 in a manner to be described below. Generally speaking, when temperature conditions permit and heat pump 20 is not in its defrost cycle, control module 16 connects the thermostat lines 24 from heat pump thermostat 22 directly to thermostat lines 26 connected to the control input 28 of heat pump 20. In this mode, when thermostat 22 calls for heat, heat pump 20 will be activated until the heat requirements have been satisfied, at which time the temperature sensed by thermostat 22 will rise sufficiently so that it will deactivate heat pump 20. Heat pump 20 may also be connected to module 16 by a defrost control line 30. During the defrost mode of heat pump 20, the outside evaporator coils are heated slightly to melt the frost which has accumulated thereon. Accordingly heat pump 20 is not able to supply heat to the building during a defrost cycle.

Temperature sensor 32 located exteriorly of the building is connected to control module 16 by line 34 and provides a signal on line 34 indicating the outside temperature. Temperature sensor 32 may be a thermocouple or other suitable temperature sensing device. An indication of outside ambient temperature is provided so that control module 16 can shutdown heat pump 20 when the outside ambient is too low, and can reenable heat pump 20 when the outside ambient has risen above a predetermined temperature, or when the outside ambient has risen by a predetermined amount above the outside ambient temperature at the time of heat pump shutdown. Preferably, control module 16 is mounted inside the heat pump outdoor unit.

Figure 2:
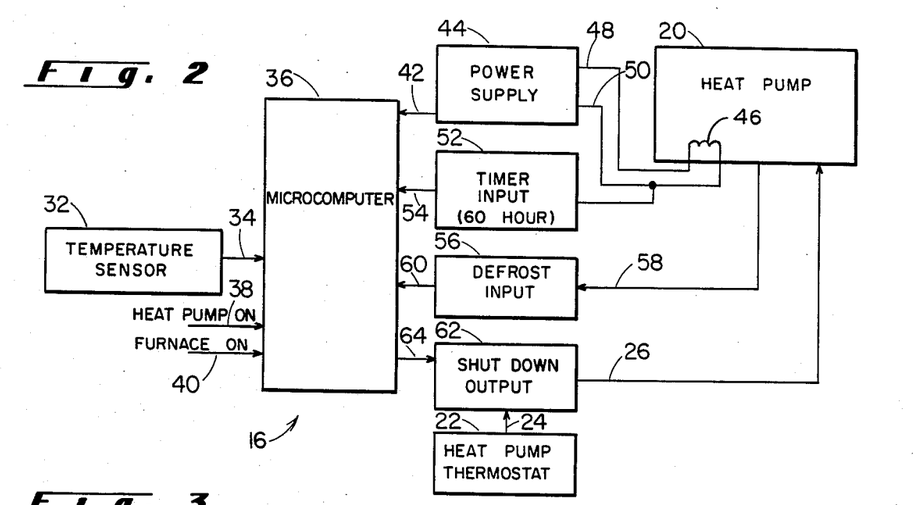
FIG. 2 is a block diagram of the disclosed embodiment of the control system.

With reference now to FIG. 2, at the heart of the control system is a microcomputer 36, which may be a Motorola MC6805R2 microcomputer, for example. Outside temperature sensor 32 is connected to one of the inputs of microcomputer 36, and input 38 from heat pump 20 is at one logic level when the heat pump 20 is operating and at the opposite logic level when heat pump 20 is off. Similarly, input 40 from furnace 10, or from its thermostat 12, is at one level when the furnace is on or heat is called for by its thermostat 12, and at the opposite logic level when furnace 10 is off or its thermostat 12 does not call for heat.

The appropriate power supply voltage levels are supplied to microcomputer 36 on lines 42 by power supply 44, which is connected to the 110 volt source in heat pump 20 by transformer 46. Thus, lines 48 and 50 supply 110 volt AC power to power supply 44. Timer input 52 is connected to the 60 hertz line 50 from heat pump 20 and supplies a low voltage input 54 to microcomputer 36 in order to trigger the counter within microcomputer 36. Defrost input circuit 56 rectifies the low voltage defrost ON signal on line 58 from heat pump 20 and supplies an appropriate logic level on input 60 to microcomputer 36 when heat pump 20 is in its defrost cycle. Heat pump thermostat 22 is connected through a relay in shutdown output circuit 62 to the control input 26 for heat pump 20. Relay 62 is opened or closed by an appropriate signal on line 64 from microcomputer 36.

Figure 3:
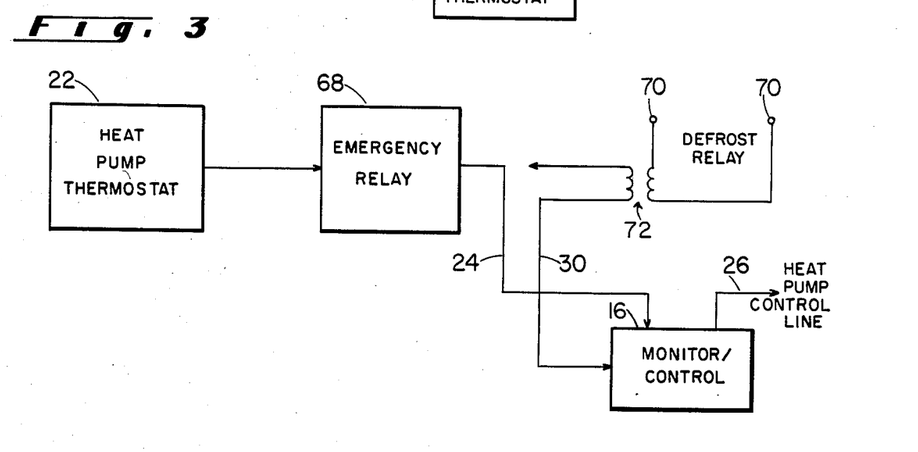
FIG. 3 is a block diagram showing the interconnection between the heat pump thermostat, heat pump and monitor/override control.

FIG. 3 illustrates additional details of the relationship between the monitor/control module 16, the heat pump thermostat 30. 22 and defrost relay 66. An emergency relay 68 may be connected in series with heat pump thermostat 22 to shutdown heat pump 20 if line pressure should fail, or other conditions internal to the heat pump 20 occur. Defrost control line 30 is connected to the 220 volt lines 70 in heat pump 20 through transformer 72, which steps this voltage down to an appropriate level. Lines 70 are energized whenever heat pump 20 is in its defrost cycle.

Figure 5:
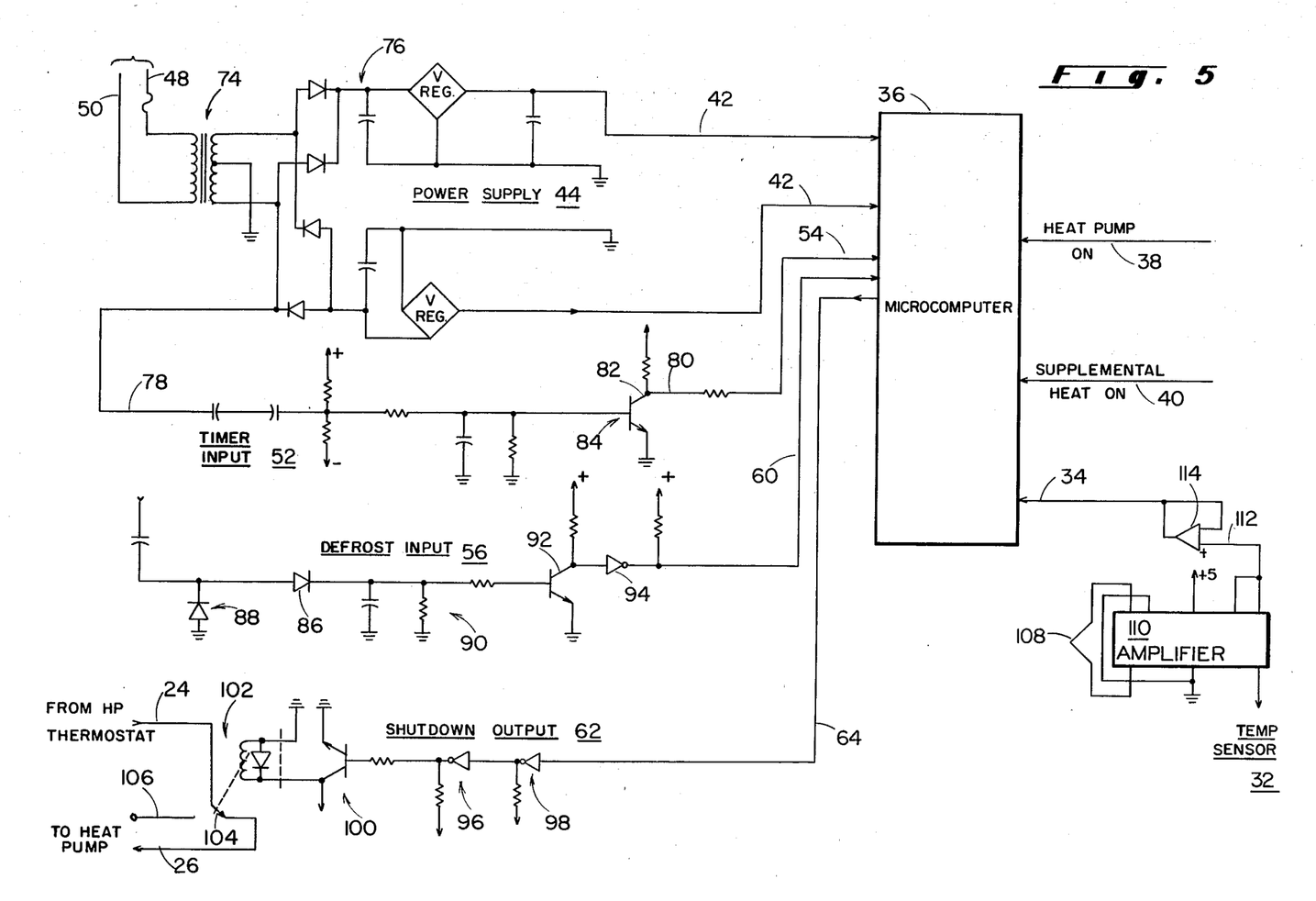
FIG. 5 is a schematic of the circuit inputs and outputs to and from the microcomputer.

Referring now FIG. 5, power supply 44 receives 110 volt AC input on lines 48 and 50, which is stepped down to 24 volts by transformer 74. Full wave rectifier 76 converts the AC current to the appropriate logic 1 and 0 levels on lines 42 connected to microcomputer 36.

Timer input circuit 52 converts the 24 volt AC current on line 78 to a pulse output on line 80 connected to the collector 82 of transistor 84. The pulse signal on line 80 alternates between the logic 1 and logic 0 levels and is connected by line 54 to pin 8 of the microcomputer chip 36.

The AC defrost signal on line 56 is half wave rectified by diodes 86 and 88 and connected through RC circuit 90 to the base of transistor 92. The collector of transistor 92 is connected to the logic 1 voltage, as is the output of inverter 94. Thus, when the AC defrost signal appears on line 58, the output 60 of inverter 94 will carry a logic 1 signal connected to pin 9 of microcomputer 36. The heat pump ON signal on line 38 is connected to microcomputer 36, and the supplemental heat ON signal on line 40 is connected through resistive heat circuit 40a to pin 11 of microcomputer 36. Circuit 40a is identical to defrost circuit 56.

Pin 10 from microcomputer 36 is connected to line 64 to the input of shutdown output circuit 62. Data register C1 in microcomputer 36 goes high when heat pump shutdown is called for by microcomputer 36, and this output goes through a double inversion by virtue of inverters 96 and 98 and is connected to the base of transistor 100. The output of transistor 100 activates a reed relay 102 causing contact 104 to move from its normally closed position in contact with line 26 to its open position in contact with terminal 106 Terminal 106 may be connected to an indicator light (not shown), if desired The input to movable contact 104 is line 24 from the heat pump thermostat 22. Thus, when relay 102 is activated, it disconnects thermostat line 24 from heat pump 20, thereby causing disablement of heat pump 20.

Temperature sensor 32 comprises a type J thermocouple 108 connected to an AD 594 thermocouple amplifier 110 which produces a 10 millivolt output for each tenth of a millivolt input from thermocouple 108. The output 112 of amplifier 110 is connected through op amp 114 to pin 24 of microcomputer 36 over line 34. Op amp 114 converts the output of amplifier 110 to various voltages within a range from 0 to plus 5 volts, which is connected to the analog to digital converter built into microcomputer 36. The microcomputer 36 converts the analog input to a digital value which is read as the ambient outdoor temperature. Thermocouple 108 is preferably located on or near the outdoor unit of the heat pump 20.

Figure 4:
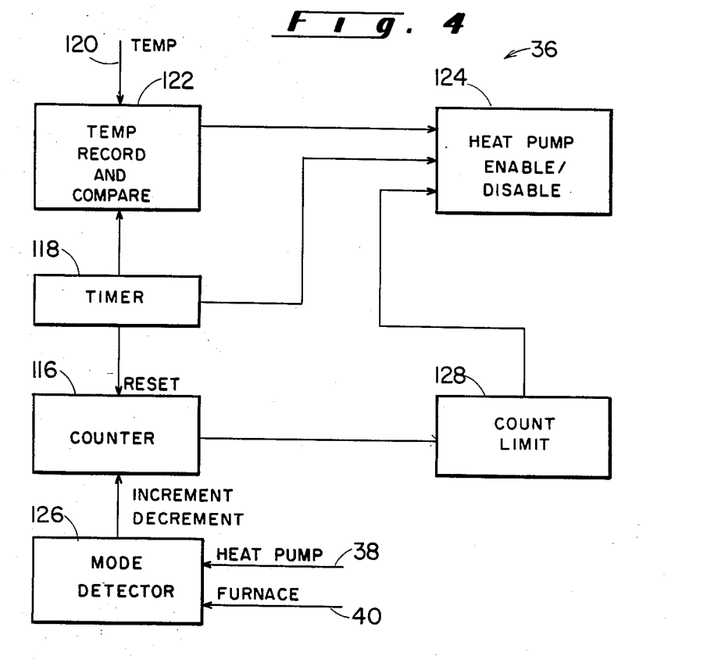
FIG. 4 is a block diagram of several of the functional blocks making up the microcomputer.

FIG. 4 illustrates in a diagrammatic fashion some of the functional blocks of microcomputer 36. Microcomputer 36 comprises a counter 116 that is reset by timer 118 driven by the 60 hertz AC input 54. The outdoor ambient temperature signal on line 120 is recorded in block 122 and compared with the sensed outdoor ambient temperature on the next interrogation of sensor 32 to determine whether the temperature has increased by a predetermined amount, for example, 5° F. Block 124 disables heat pump 20 when the outdoor ambient is below a certain level, for example, 15° F., and reenables heat pump 20 when the outdoor temperature is above a predetermined level, for example, 40° F. Block 124 also reenables heat pump 20 when the outdoor ambient has risen by a predetermined amount, for example, 5° F. The reason for requiring a certain increment of temperature increase to occur before reenablement of heat pump 20 is to avoid frequent on and off cycling.

Timer 20 is connected to heat pump enable/disable block 124 and causes reenablement of heat pump 20 after a certain period of time, for example, 12 hours. Even though the temperature may not have risen 5° in this time period, it may have risen sufficiently to enable the heat pump to operate efficiently, yet the period is long enough to avoid frequent cycling on and off of the heat pump.

Counter 116 is incremented or decremented by a signal from mode detector block 126, depending on whether heat pump 20 is on simultaneously with furnace 10 or not depending on the signals on lines 38 and 40. Microcomputer 36 causes interrogation of the heating system on a periodic basis, and if both lines 38 and 40 are activated as detected by mode detector 126, counter 116 is incremented, but if only one or neither line is activated, counter 116 is decremented. Alternatively, only line 40 need be monitored, and if the supplemental heat is activated on an interrogation, counter 116 will be incremented, otherwise it will be decremented. This alternative mode of operation is possible because whenever furnace 10 is operating, due to a call for heat, heat pump 20 will also be operating either in its normal or defrost cycle because of the higher thermostat setting.

When counter 116 reaches a predetermined limit as sensed by count limit block 128 indicating that simultaneous or furnace operation has occurred for a predetermined portion of the heating cycle, for example, 50 percent of the time, then enable/disable block will disable heat pump 20. Timer 118 establishes the heating cycle for counter 116 and will reset it when the heating cycle has been completed so that counter 116 will begin counting back up from zero. In the embodiment disclosed, counter 116 has a minimum value of zero and microcomputer 36 triggers to cause shutdown of the heat pump 20 when its count reaches a count equal to 50% of the total number of interrogations of the system during one heat cycle. A typical heat cycle would be one hour long.

Figure 6:
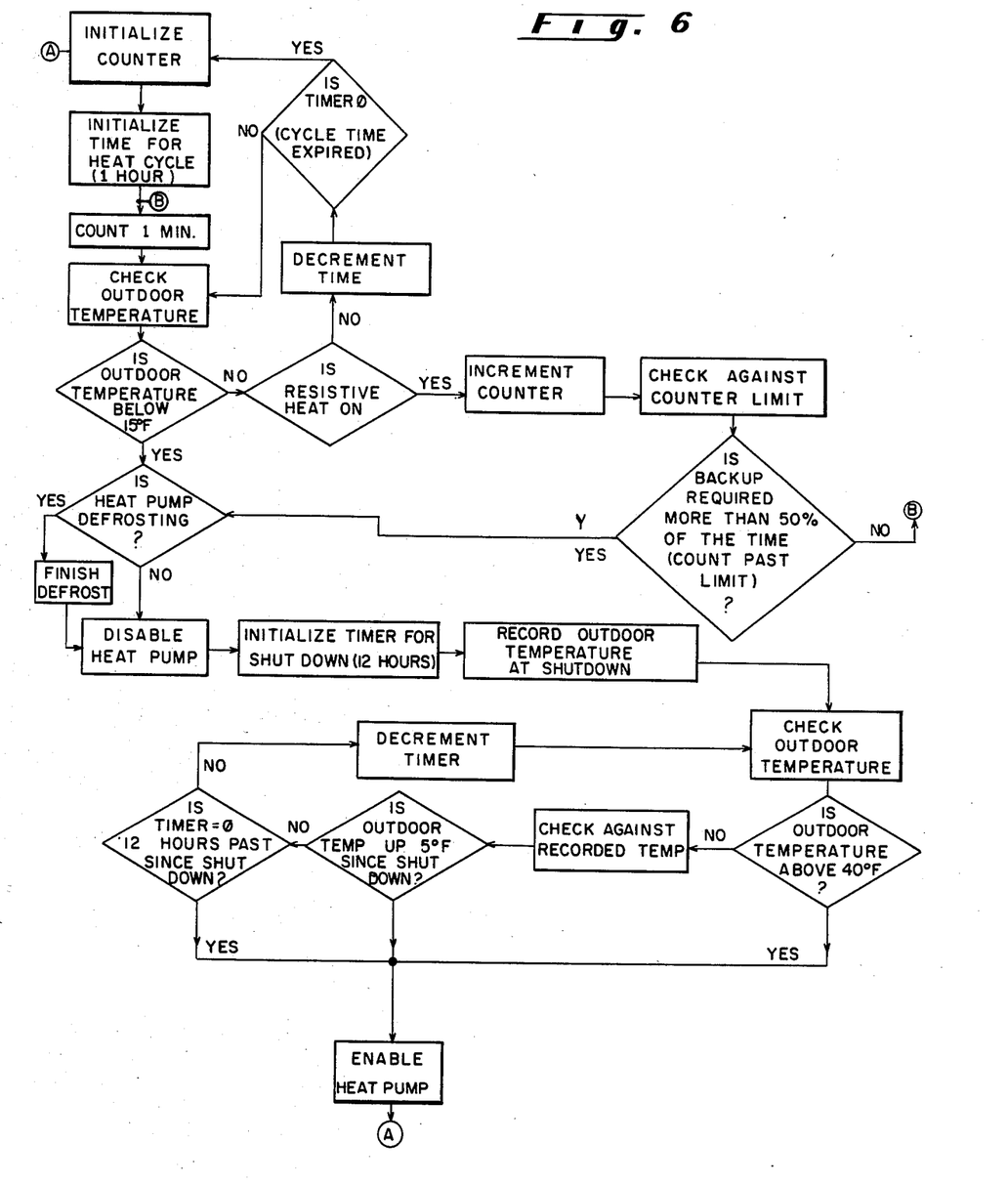
FIG. 6 is a flow chart illustrating the programmed operation of the microcomputer of FIG. 5.

Since microcomputer 36 controls the operation of the heat control system, its operation can best be described by reference to the flow chart shown in FIG. 6 for the routine programmed into microcomputer 36. On start up, counter 116 is initialized for the heat cycle, for example, one hour, and outdoor temperature sensor 32 is interrogated. If the outdoor temperature is not below 15° F., which is a value that can be programmed into microcomputer 36, and if resistive heat is not on counter 116 is decremented, timer 118 is interrogated to determine whether or not the cycle time has expired, and the outdoor temperature is interrogated once again. If the one hour heat cycle has expired, then counter 116 is again initialized.

If the interrogation of the outside temperature indicates that it is above 15° F. and furnace 10 is on, then counter 116 is incremented and its count is compared against the counter limit. If supplemental heat is required for more than a predetermined portion of the heating cycle, for example, 50 percent of the time, this is indicated by the counter exceeding the limit. Input 60 from the defrost circuit 56 is then interrogated, and if the heat pump is defrosting, it is permitted to finish its defrost cycle after which the heat pump is disabled by placing an appropriate disable signal on line 64 causing relay 102 to disconnect the heat pump thermostat line 24 from heat pump 20. If the counter limit has not yet been reached or exceeded, the outdoor temperature is again interrogated after the appropriate interval.

When the heat pump is disabled either because of an outdoor ambient temperature below 15° F. or supplemental heat being required more than 50 percent of the time, timer 118 is initialized to shutdown the system for a 12 hour period, for example. Also the outdoor temperature is recorded at shutdown. During shutdown, the outdoor temperature is periodically interrogated, and if it is above 40° F., then heat pump 20 is again enabled, because this would indicate that ambient temperature conditions are sufficiently high to permit efficient heat pump operation. If desired, other restore temperatures could be programmed in, for example, 35° F. If the outdoor temperature is still not above 40° F., the current outdoor ambient temperature is compared against the temperature recorded at shutdown, and if it has risen by at least 5° F., then heat pump 20 is enabled. If it has not risen by 5° F., the timer is interrogated, and if it is not yet exceeded 12 hours since the last shutdown, timer 118 is decremented and the cycle is repeated. If timer 116 has reached a 12 hour limit, heat pump 20 is again enabled and the routine performed during heat pump enablement is again repeatedly performed. As indicated previously, heat pump disablement and enablement is accomplished by reed relay 102.

The following is a suitable program for microcomputer 36 to perform the operation described above:

| | A ADATA | EQU | $000 | |
|---|---|---|---|---|
| | A BDATA | EQU | $001 | |
| | A CDATA | EQU | $002 | |
| | A ADDR | EQU | $004 | |
| | A BDDR | EQU | $005 | |
| | A CDDR | EQU | $006 | |
| | A TIMDAT | EQU | $008 | |
| | A TIMCTL | EQU | $009 | |
| | A TEMCTL | EQU | $00E | |
| | A OUTEMP | EQU | $00F | |
| | A EIGHTY | EQU | $80 | |
| | | ORG | $10 | |
| | * | VARIABLE TABLES | | |
| | A COUNT0 | RMB | 1 | |
| | A COUNT1 | RMB | 1 | |
| | A LOWLMT | RMB | 1 | |
| | A UPLMT | RMB | 1 | |
| | A DEFCNT | RMB | 1 | |
| | A DEFLMT | RMB | 1 | |
| | A TMPREF | RMB | 1 | |
| | A TIME1 | RMB | 1 | |
| | A TIME2 | RMB | 1 | |
| | * | PROGRAM ORIGIN | | |
| | | ORG | $80 | |
| | * | RESET INITIALIZATION | | |
| | INIT | RSP | | |
| A | | LDA | #$00 | |
| A | | STA | ADATA | |
| A | | STA | CDATA | |
| A | | STA | LOWLMT | |
| A | | STA | DEFCNT | |
| A | | STA | ADDR | |
| A | | LDA | #$01 | |
| A | | STA | BDATA | |
| A | | STA | BDDR | |
| A | | LDA | #$02 | |
| A | | STA | CDDR | |
| A | | LDA | #$8D | |
| A | | STA | UPLMT | |
| A | | LDA | #$1E | |
| A | | STA | DEFLMT | |
| A | | LDA | #$07 | |
| A | | STA | COUNT1 | |
| A | | LDA | #$FF | |
| A | | STA | COUNT0 | |
| A | | STA | TIMDAT | |
| A | | LDA | #%00001111 | |
| A | | STA | TIMCTL | |
| | | CLI | | |
| 00AE | | BRA | * | |
| | * | TIMER INTERRUPT | | |
| A | TIRQ | DEC | COUNT0 | |
| 00CA | | BNE | AGAIN | |
| A | | DEC | COUNT1 | |
| 00CA | | BNE | AGAIN | |
| | | SWI | | GOTO COMMUNICATIO |
| | * | MONITOR ROUTINES | | |
| 00C0 | | BRSET | 1,CDATA, MONITO | |
| 00D3 | MONIT1 | BSR | TMPCHK | MONIT NORMAL OPER |
| 00C2 | | BRA | WAYOUT | |
| 010D | MONIT0 | BSR | MONIT2 | |
| A | WAYOUT | LDA | #$FF | |
| A | | STA | COUNT0 | |
| A | | LDA | #$07 | |
| A | | STA | COUNT1 | |
| A | AGAIN | LDA | #$FF | |
| A | | STA | TIMDAT | |
| A | | LDA | #%00001111 | |
| A | | STA | TIMCTL | |
| | | RTI | | |
| | * | CHECK TEMP & DEFROST | | |
| 0135 | TMPCHK | BSR | GETEMP | |
| A | | CMP | LOWLMT | |
| 00F9 | | BLS | SHUTDN | |
| 00E6 | | BRSET | 0,CDATA,DEFCHK | |
| | ** | BRANCH IF RESISTIVE HEAT ON | | |
| 00E6 | | BRSET | 2,CDATA,DEFCHK | |
| A | | TST | DEFCNT | |
| 00E5 | | BEQ | RETURN | |
| A | | DEC | DEFCNT | |
| | RETURN | RTS | | |
| A | DEFCHK | LDA | DEFCNT | CHECK DEFROST |
| | | INCA | | |
| A | | CMP | DEFLMT | |
| 00F0 | | BHI | CHKALM | |
| A | | STA | DEFCNT | |
| | | RTS | | |
| 0135 | CHKALM | BSR | GETEMP | |
| A | | CMP | UPLMT | DEFROST IN WARM WEATHER? |
| 00F9 | | BLS | SHUTDN | |
| A | | BCLR | 0,BDATA | SEND ALARM |
| | | RTS | | |
| | * | SHUTDOWN ROUTINE | | |
| 00F9 | SHUTDN | BRSET | 0,CDATA,SHUTDN | |
| A | | BSET | 1,CDATA | SHUT IT DOWN |
| 0135 | | BSR | GETEMP | |
| A | | ADD | #$19 | |
| A | | STA | TMPREF | RESUME AT |

-continued

|   |         |       | TEMP |
|---|---------|-------|------|
| A |   | LDA | #$B4 |   |
| A |   | STA | TIME1 | INITIALIZE 12 |
| A |   | LDA | #$04 | HOUR TIMER |
| A |   | STA | TIME2 |   |
|   |   | RTS |   |   |
|   | *   |   | MONITOR SHUTDN |   |
| 0135 | MONIT2 | BSR | GETEMP |   |
| A |   | CMP | LOWLMT |   |
| 011B |   | BLS | LOOP0 |   |
| A |   | CMP | UPLMT |   |
| 012E |   | BHS | RESUME |   |
| A |   | CMP | TMPREF |   |
| 012E |   | BHS | RESUME |   |
|   | ***** |   | 12 HOUR SHUTDOWN TIMER |   |
| A | LOOP0 | LDA | TIME1 |   |
|   | LOOP1 | DECA |   |   |
| 0123 |   | BEQ | LOOP2 |   |
| A |   | STA | TIME1 |   |
|   |   | RTS |   |   |
| A | LOOP2 | LDA | TIME2 |   |
|   |   | DECA |   |   |
| 012E |   | BEQ | RESUME |   |
| A |   | STA | TIME2 |   |
| A |   | LDA | #$B4 |   |
| 011D |   | BRA | LOOP1 |   |
|   | ***** |   | RESUME NORMAL OPERATION |   |
| A | RESUME | BCLR | 1,CDATA |   |
| A |   | LDA | #$00 |   |
| A |   | STA | DEFCNT | INITIALIZE DEFROS |
|   |   | RTS |   |   |
|   | ***** |   | GET OUTDOOR TEMP |   |
| A | GETEMP | LDA | #$00 |   |
| A |   | STA | TEMCTL |   |
| 0139 | TEMRDY | BRCLR | 7,TEMCTL,TEMRDY |   |
| A |   | LDA | OUTEMP |   |
|   |   | RTS |   |   |
|   | ***** |   | INTERRUPT TO COMMUNICATE |   |
|   | ***** |   | WITH BUILD MONITOR-SERIAL |   |
|   | POLL | RTI |   | NO TALK THIS VERS |
|   | ***** |   | INTERRUPT VECTORS & MOR |   |
|   |   | ORG | $F38 | MOR |
| A |   | FCB | $8F |   |
|   |   | ORG | $FF8 | INTERRUPT VECTORS |
| A |   | FDB | TIRQ |   |
| A |   | FDB | POLL |   |
| A |   | FDB | POLL |   |
| A |   | FDB | INIT |   |
|   |   |   | END |   |

By using a microcomputer 36 for control of the system, the various limits and values can be easily programmed in so that the system can be adapted for use in various climatic areas. Although the counter 116 within microcomputer 36 has been programmed so that it increments when there is simultaneously heat pump and supplemental heat operation or when supplemental heat operation is detected on an interrogation, it could be programmed to decrement when this condition occurs and increment when there is no simultaneous operation or supplemental heat operation. Separate heat thermostats 22 and 12 for the heat pump and furnace 10 have been disclosed, but a dual thermostat could also be used.

While this invention has been described as having a preferred design, it will be understood that it is capable of further modification. This application is, therefore, intended to cover any variation, uses, or adaptations of the invention following the general principles thereof and including such departures from the present disclosure as come within known or customary practice in the art to which this invention pertains and fall within the limits of the appended claims.

What is claimed is:

1. A heating system comprising:
   supplemental heating means for supplying heat to an interior space,
   heat pump means for supplying heat to the interior space,
   control means including at least one thermostat having a sensor in the interior space for activating at least one of said supplemental heating means and said heat pump means into operation, and
   heat pump control override means for detecting the simultaneous operation of said heat pump means and said supplemental heating means snd disabling said heat pump means from operation when such detected simultaneous operation occurs for a predetermined portion of a give cyclically recurring time interval.

2. The heating system of claim 1 wherein said heat pump override means comprises: a counter, means for one of incrementing and decrementing said counter when said heat pump and supplemental heating means are simultaneously operating and for the other of incrementing and decrementing said counter when said heat pump means and supplemental heating means are not simultaneously operating, and means for detecting said counter reaching a predetermined limit and disabling said heat pump means in response to said counter reaching said predetermined limit.

3. The heating system of claim 2 including means for adjusting the counter limit.

4. The heating system of claim 1 wherein said override means includes means for detecting when said heat pump means is in a defrost cycle and waiting until said heat pump means completes its defrost cycle before disabling said heat pump means if disabling of the heat pump means is otherwise called for.

5. The heating system of claim 1 wherein said override means includes means for detecting outside ambient temperature and disabling said heat pump means when the outside ambient temperature detected thereby falls below a predetermined shutdown level.

6. The heating system of claim 5 wherein said override means enables said heat pump means when the outside ambient temperature detected by said detecting means is equal to said predetermined shutdown level plus a predetermined temperature increment, wherein said predetermined temperature increment is greater than zero.

7. The heating system of claim 5 wherein said override means includes means for enabling said heat pump means when the outside ambient temperature detected by said detecting means is above a predetermined restore temperature level.

8. The heating system of claim 1 wherein said override means includes: means for measuring and recording the outside ambient temperature, and means for reenabling said heat pump means after disabling when one of the following conditions occurs:
   (a) the measured outside ambient temperature exceeds a predetermined restore temperature level,
   (b) the measured outside ambient temperature level is a predetermined amount higher than the outside ambient temperature when said heat pump means was last disabled.

9. The heating system of claim 1 wherein said override means includes: means for measuring and recording outside ambient temperature, timer means for measuring the time elapsed since the heat pump means was last disabled, and means for reenabling said heat pump means after disabling when one of the following conditions occurs:
(a) the measured outside ambient temperature exceeds a predetermined restore temperature level,
(b) the measured outside ambient temperature level is a predetermined amount higher than the outside ambient temperature when said heat pump means was last disabled,
(c) a predetermined amount of time has elapsed since the heat pump means was last disabled.

10. A heating system comprising:
supplemental heating means for supplying heat to an interior space,
heat pump means for supplying heat to the interior space,
control means connected to said heat pump means including means for detecting the ambient temperature in the interior space and selectively activating and deactivating said heat pump means and selectively activating and deactivating said supplemental heating means in response to the ambient temperature of the interior space, and
heat pump control override means for detecting the activation of said supplemental heating means and disabling said heat pump means when said supplemental heating means is detected as being activated for a predetermined portion of a given cyclically recurring time interval.

11. The heating system of claim 10 wherein said control means comprises: a supplemental heat thermostat connected to activate and deactivate said supplemental heating means; a heat pump thermostat; and said heat pump override means comprises relay means having an input to which said heat pump thermostat is connected, an output connected to a control input of said heat pump means, and a relay control input; and said override means enables said heat pump means by causing said relay to connect said heat pump thermostat through to said heat pump control input.

12. The heating system of claim 10 wherein said control means comprises a supplemental heat thermostat connected to activate and deactivate said supplemental heating means and a heat pump thermostat, and wherein said heat pump control override means enables said heat pump means by connecting said heat pump thermostat through to said heat pump means and to disable said heat pump means by disconnecting said heat pump thermostat from said heat pump means.

13. The heating system of claim 10 wherein said heat pump override means comprises: a counter, means for one of incrementing and decrementing said counter when said supplemental heating means is activated and means for the other of incrementing and decrementing said counter when said supplemental heating means is deactivated, and means for detecting a predetermined count in said counter and disabling said heat pump means in response to said count.

14. The heating system of claim 13 wherein said heat pump override means comprises means for resetting said counter at the end of each said cyclically recurring time interval.

15. The heating system of claim 10 wherein said override means includes means for detecting when said heat pump means is in a defrost cycle and waiting until said heat pump means completes its defrost cycle before disabling said heat pump means if disabling of the heat pump means is otherwise called for.

16. The heating system of claim 10 wherein said override means includes: means for measuring and recording the outside ambient temperature, and means for reenabling said heat pump means after disabling when one of the following conditions occurs:
(a) the measured outside ambient temperature exceeds a predetermined restore temperature level,
(b) the measured outside ambient temperature level is a predetermined amount higher than the outside ambient temperature when said heat pump means was last disabled.

17. The heating system of claim 10 wherein said override means includes: means for measuring and recording outside ambient temperature, timer means for measuring the time elapsed since the heat pump means was last disabled, and means for reenabling said heat pump means after disabling when one of the following conditions occurs:
(a) the measured outside ambient temperature exceeds a predetermined restore temperature level,
(b) the measured outside ambient temperature level is a predetermined amount higher than the outside ambient temperature when said heat pump means was last disabled,
(c) a predetermined amount of time has elapsed since the heat pump means was last disabled.

18. The heating system of claim 10 wherein said override means includes means for measuring and recording outside ambient temperature and means for reenabling said heat pump means after disabling when the measured outside temperature is a predetermined amount higher than the outside ambient temperature at the time said heat pump means was last disabled.

19. The heating system of claim 10 wherein said override means includes means for measuring outside ambient temperature, and means for reenabling said heat pump means after disabling when the measured outside temperature exceeds a predetermined restore temperature level.

20. The heating system of claim 10 wherein said override means includes means for measuring the time elapsed since the heat pump means was last disabled, and means for reenabling said heat pump means after disabling when a predetermined amount of time has elapsed since the heat pump means was disabled.

21. The heating system of claim 10 wherein said control means comprises a supplemental heat thermostat and said heat pump control override means detects the activation of said supplemental heating means by monitoring said thermostat.

22. A control system for controlling a heating system having a supplemental heat source for supplying heat to a building, a heat pump for supplying heat to the building, and a thermostat apparatus for activating and deactivating the supplemental heat source and the heat pump in response to ambient temperatures in the building sensed by the thermostat apparatus, said control system comprising:
monitor means adapted to be connected to either the supplemental heat source or the thermostat apparatus for detecting the activation of the supplemental heat source for a predetermined portion of a given cyclically recurring time interval, and override means connected to said heat pump means and to said monitor means for disabling said heat pump means in response to said monitor means detecting the activation of the supplemehtal heat source for said predetermined portion of the time interval.

23. The heating system of claim 22 wherein: said monitor means comprises a counter, means for repeatedly interrogating the state of said supplemental heat source, and means for one of incrementing and decrementing said counter when said supplemental heat source is detected as being activated and the other of incrementing and decrementing said counter when said supplemental heat source is detected as being deactivated; and said override means includes means for disabling the heat pump when a predetermined count is present in said counter.

24. The control system of claim 22 further including: means to be adapted to be connected to the heat pump for detecting when the heat pump is in a defrost cycle and waiting until the heat pump completes its defrost cycle before disabling the heat pump if disabling of the heat pump is otherwise called for.

25. The control system of claim 22 including an outside ambient sensor means for sensing the outside ambient temperature, wherein said sensor means is connected to said override means, and wherein said override means includes means for disabling the heat pump when the outside ambient temperature sensed by the sensor means is below a predetermined shutdown level.

26. The control system of claim 25 wherein override means includes means for enabling the heat pump when the outside ambient temperature sensed by the sensor means is above a predetermined restore level.

27. The control system of claim 26 wherein said override means includes means for recording the outside ambient temperature sensed by said sensor means at the time of heat pump disabling and means for reenabling the heat pump when the sensed outside ambient temperature is higher than the temperature recorded at heat pump disabling by a predetermined temperature differential.

28. The control system of claim 27 wherein said override means includes a timer means for measuring the time elapsed since the heat pump was last disabled and means for reenabling the heat pump when a predetermined amount of time has elapsed since the heat pump was last disabled.

29. The control system of claim 28 wherein said override means and said monitor means comprise a programmable microcomputer means including means for programming therein the length of the cyclically recurring time interval, the shutdown level of the outside ambient temperature, the restore level of the outside ambient temperature, the temperature differential and the value of the predetermined amount of elapsed time.

30. A heating system comprising:
supplemental heating means for supplying heat to an interior space, said supplemental heating means including a supplemental heat thermostat means for sensing the ambient temperature in the interior space and activating into operation said supplemental heating means in response to the sensed temperature falling below a first predetermined limit,
heat pump means for supplying heat to the interior space, said heat pump means including a heat pump thermostat means for sensing the ambient temperature of the interior space and being connected to a control means on said heat pump means, said control means activating into operation said heat pump means in response to the ambient temperature sensed by the heat pump thermostat means falling lower than a second predetermined limit, said second predetermined limit being higher than said first limit, and
heat pump control monitor and override means for detecting the operation of said supplemental heating means and disabling said heat pump means when said supplemental heating means is detected as being activated for a predetermined portion of a given cyclically recurring time interval.

31. The heating system of claim 30 wherein said heat pump thermostat means is connected to said heat pump control means through said monitor and override means, and said monitor and override means disables said heat pump means by disconnecting said heat pump thermostat means from said heat pump control means.

32. A method of controlling a heating system having a supplemental heat source and a heat pump for supplying heat to an interior space, wherein the heating system includes a thermostat mechanism that activates the heat pump and supplemental heat source in response to ambient temperatures in the interior space sensed by the thermostat, said method comprising: sensing when the supplemental heat source is operating during a cyclically recurring time interval, and disabling the heat pump when the supplemental heat source is operating for a predetermined portion of the cyclically recurring time interval.

33. The method of claim 32 including the steps of: periodically interrogating the supplemental heat source, one of incrementing or decrementing a counter if the supplemental heat source is operating when interrogated and the other of incrementing and decrementing the counter when the supplemental heat source is not operating when interrogated, and disabling the heat pump when a predetermined count in the counter is reached.

34. The method of claim 32 wherein the heat pump is disabled by interrupting a connection between a thermostat and a control input of the heat pump.

35. The method of claim 32 including the step of sensing the outside ambient temperature and disabling the heat pump when the sensed temperature is below a predetermined level.

36. The method of claim 32 including the step of reenabling the heat pump when the sensed outdoor ambient temperature is above a predetermined level.

37. The method of claim 32 including the steps of: sensing and recording the outside ambient temperature at the time the heat pump is disabled and reenabling the heat pump when the outside temperature sensed is higher by a predetermined amount than the recorded temperature when the heat pump was last disabled.

38. The method of claim 32 including measuring the amount of time elapsed since the last disablement of the heat pump and reenabling the heat pump if the measured elapsed time exceeds a predetermined amount.

39. A method of controlling a heating system having a supplemental heat source and a heat pump for supplying heat to an interior space, wherein the heating system includes a thermostat mechanism that activates the heat pump and supplemental heat source in response to ambient temperature sensed by the thermostat, said method comprising: sensing when the supplemental heat source is operating simultaneously with the heat pump during a cyclically recurring time interval, and disabling the heat pump when simultaneous heat pump and supplemental heat source operation occurs for a predetermined portion of the cyclically recurring time interval.

* * * * *